(12) United States Patent
Children

(10) Patent No.: US 11,592,242 B2
(45) Date of Patent: Feb. 28, 2023

(54) GASKET FOR A PLATE HEAT EXCHANGER

(71) Applicant: TRP Sealing Systems Limited, Hereford (GB)

(72) Inventor: Simon Children, Hereford (GB)

(73) Assignee: TRP Sealing Systems Limited, Hereford (GB)

( * ) Notice: Subject to any disclaimer, the term of this patent is extended or adjusted under 35 U.S.C. 154(b) by 20 days.

(21) Appl. No.: 17/057,618

(22) PCT Filed: May 22, 2019

(86) PCT No.: PCT/GB2019/051411
§ 371 (c)(1),
(2) Date: Nov. 20, 2020

(87) PCT Pub. No.: WO2019/224537
PCT Pub. Date: Nov. 28, 2019

(65) Prior Publication Data
US 2021/0148649 A1    May 20, 2021

(30) Foreign Application Priority Data

May 22, 2018    (GB) ..................................... 1808395

(51) Int. Cl.
*F28F 3/10*    (2006.01)
*F28F 3/08*    (2006.01)
*B29L 31/26*    (2006.01)
*F16J 15/06*    (2006.01)

(52) U.S. Cl.
CPC ................ *F28F 3/10* (2013.01); *F28F 3/083* (2013.01); *B29L 2031/265* (2013.01); *F16J 15/061* (2013.01); *F28F 2230/00* (2013.01); *F28F 2275/085* (2013.01)

(58) Field of Classification Search
CPC .. F16J 15/061; F28F 3/10; F28F 3/083; F28F 2230/00; F28F 2275/085
See application file for complete search history.

(56) References Cited

U.S. PATENT DOCUMENTS 4,432,415 A * 2/1984 Wright ...................... F28F 3/10
                                                      165/166
4,635,715 A * 1/1987 Andersson ................ F28F 3/10
                                                      403/375
4,995,455 A   2/1991 Mathur
(Continued)

FOREIGN PATENT DOCUMENTS

CN        104075609 A    4/2017
EP          0147453 B1   5/1987
(Continued)

*Primary Examiner* — Eric S Ruppert
*Assistant Examiner* — Hans R Weiland
(74) *Attorney, Agent, or Firm* — Traverse Legal, PLC

(57) ABSTRACT

A gasket for a plate heat exchanger, wherein the gasket includes a body in the form of a loop for fitting to a plate of the plate heat exchanger. The body includes one or more peripheral connection areas spaced along at least one side of the loop, and a plurality of tabs for securing the gasket in position on the plate. Each tab is discrete from the body, and each tab includes a connection which is receivable by or engageable with one of the connection areas to connect the tabs and body together.

20 Claims, 5 Drawing Sheets

(56) References Cited

U.S. PATENT DOCUMENTS

| | | | | |
|---|---|---|---|---|
| 5,178,212 | A | * | 1/1993 | Nakamura ................ F28F 3/10 165/166 |
| 5,988,268 | A | * | 11/1999 | Usami ...................... F28F 3/10 165/166 |
| 6,186,224 | B1 | * | 2/2001 | Seidel ...................... F28F 3/10 165/166 |
| 6,935,415 | B1 | * | 8/2005 | Petersen .................. F28F 3/10 165/166 |
| 2005/0269058 | A1 | * | 12/2005 | Tagesson .................. F28F 3/10 165/70 |
| 2009/0159251 | A1 | | 6/2009 | Blomgren |
| 2011/0259561 | A1 | * | 10/2011 | Krantz ..................... F28F 3/10 165/168 |
| 2014/0262175 | A1 | * | 9/2014 | Vanderwees ............. F28F 3/10 29/890.03 |
| 2016/0282060 | A1 | * | 9/2016 | Rasmussen ............... F28F 3/10 |
| 2019/0003783 | A1 | * | 1/2019 | Hedberg .................. F28F 3/10 |

FOREIGN PATENT DOCUMENTS

| | | | |
|---|---|---|---|
| EP | 04050188 | A1 | 12/1990 |
| EP | 0450188 | A1 * | 10/1991 |
| EP | 2762823 | A1 | 1/2013 |
| EP | 2886998 | A1 | 12/2013 |
| WO | 9967589 | A2 | 6/1999 |
| WO | 2010071551 | A2 | 11/2009 |

* cited by examiner

GASKET FOR A PLATE HEAT EXCHANGER

CROSS REFERENCE TO RELATED APPLICATIONS

The present application claims the benefit to International Application No. PCT/GB2019/051411 filed on May 22, 2019 and U. K. Patent Application No. 1808395.6 filed on May 22, 2018, which are incorporated herein by reference in their entireties.

FIELD

The present invention relates to a gasket for a plate heat exchanger, a method of forming the gasket, a tab connectable to a gasket, and a gasket for receiving a plurality of tabs.

BACKGROUND

Plate heat exchangers are used to transfer or recover thermal energy from fluids in a variety of applications. The applications range from desalination or oil heating apparatus on ships, to chemical processing, engine cooling, and use in manufacturing plants for the pasteurisation of milk.

In commercial applications, a typical plate heat exchanger includes a series of thin corrugated metallic plates sealed against one another by gaskets. The gaskets are often made of a rubber and polymer mixture. Fluid passes over the surfaces of adjacent plates in the regions sealed by the gaskets. The large surface area facilitates thermal transfer between fluid flowing between pairs of neighbouring plates.

However, rubber gaskets are prone to degradation over time. They need to be replaced periodically to avoid seal failure and leakages. Commercial heat exchangers are relatively large and the seals are difficult to handle. A particular difficulty arises in placing and holding the seal in position on a heat exchanger plate prior to the seal being held in place by, for example, an adjacent plate.

To solve this issue, a gasket can sometimes be glued in place. In order to replace a glued-on gasket, the service technician must carefully prise it off, for example, to avoid damaging the plate. This is a laborious and time-consuming process, and further time may be required to clean the plate of any residue.

To address this issue, clip-on gaskets can be used which mechanically grip edges of the plate, rather than being bonded to it. The gasket still seals the plate normally when a series of plates are held together, but there are a series of integrally-formed clips or tabs around its edge. The clips are co-moulded with the main body of the gasket during manufacture, and make it much easier to position the gasket on a plate, and also to remove it during servicing.

Example views of existing clip types are shown in FIGS. 1A to 1F. FIG. 1A shows two types of 'T' clip, which extend out from the body to different extents. The T clips have arms or fingers which depend from the crossbar of the same/varying lengths. The arms fit over edges or protrusions on a plate to hold the gasket in place. This is illustrated in FIG. 1G.

Other types of available clips hold the gasket on the plate in similar ways. FIG. 1B shows a 'D' clip (part of the D shape being provided by the gasket body), with fingers extending into the middle of the D shape. FIG. 1C shows a clip with a 'pip' which is pushed through a hole in the plate. FIGS. 1D and 1E show variations of a bar-type clip which is pushed into or through a hole in the plate, positioned outside the sealing portion of the gasket. FIG. 1F shows slot-type clip which fits into a slot which extends inwards from an edge of the plate.

However, whilst using clips has benefits relative to a glued-on gasket, it makes the gasket manufacturing process more difficult, time-consuming and expensive. It also requires more rubber. It may also be necessary to provide appropriately placed holes or similar in the plate.

In the manufacture of a gasket, rubber is heated in a press and conforms to the shape of a gasket. The cold rubber is initially laid onto the lower of the press plates in a channel where the gasket is to be formed. Long cylindrical pieces of rubber are used to form the main seal. Numerous additional individual pieces of rubber have to be manually placed at each clip location next to the long pieces of rubber (as shown in FIG. 1H), which is time-consuming and increases the average time to manufacture each gasket. Furthermore, it takes time to sufficiently bond the individual pieces of rubber to the main gasket, so manufacture cannot be rushed or else the clips will have flimsy connections and break off easily.

If any of the clip locations are accidentally left empty when the press is activated, then the entire resulting gasket will need to be scrapped because it will not have enough clips to properly hold it on a plate. Each gasket also needs residual edging (or 'flash') removed before it can be used in a plate heat exchanger. This is a time-consuming manual process, because careful removal is required to avoid damaging the clips. It is not practical to tumble the gaskets to remove the residual material because they would become entangled, and both the tumbling and subsequent untangling can break off the clips.

It is an object of the present invention to reduce or substantially obviate the aforementioned problems.

SUMMARY

According to the present invention, there is provided a gasket for a plate heat exchanger, the gasket comprising a body in the form of a loop for fitting to a plate of the plate heat exchanger, the body including a plurality of peripheral connection areas spaced along at least one side of the loop, each peripheral connection area being integrally formed with the body, each peripheral connection area including tab connection means, and a plurality of tabs for securing the gasket in position on the plate, each tab being discrete from the body, and each tab including gasket connection means which is receivable by or engageable with the tab connection means in one of the connection areas to connect the tabs and body together, each tab being connectable to one of the connection areas of the gasket body by movement (or translation) of the tab substantially along an axis of the tab connection means, when the gasket connection means is aligned along that axis, the axis being substantially perpendicular to the plane of that connection area.

Optional features are presented in the dependent claims.

The invention has several key advantages associated with gasket manufacture. It is not necessary to position extra pieces of rubber in the mould prior to forming a gasket in order to form the connection areas, because the peripheral connection areas are small enough to be formed from the same material used to form the gasket body. This speeds up filling the mould with material prior to gasket formation, and also avoids the need to scrap gaskets where tab material is accidentally omitted.

The time needed to form the gasket is also reduced, because the gasket is tab-less and instead adapted for tabs to be attached post-manufacture. If tabs were integrally formed with the gasket then they would grip the mould and it would take time to remove the gasket from the mould. By omitting the tabs when manufacturing the body of the gasket, it is easier to extract the gasket from the mould. This makes it possible to manufacture a gasket more quickly because the cycle time is reduced.

Furthermore, because there are no tabs on the gasket immediately after manufacture, the flash (residual gasket material) around the edges of the gasket body can be stripped off immediately, without needing particular care. Therefore, all stages of gasket manufacture are significantly faster than currently possible. The tabs are added to a gasket in a separate step, e.g. when a technician connects the gasket to a plate for a plate heat exchanger, and gluing can be waived. Forming the tabs is no longer a rate-limiting step for gasket manufacture.

Unlike conventional gaskets, where the tabs are formed as part of the gasket, the present invention provides tabs which are not integrally bonded to the gasket. The tabs may be releasably attachable to the body. If a particular tab becomes damaged or degraded, it can be replaced without needing to replace the whole gasket.

Each tab does not connect to the sealing portion of a gasket. Each tab connects to a given part of the gasket which is outside of the sealing portion, i.e. to a peripheral connection area.

Assembly of the tabs with the gasket may be automated. That is, a robot or machine may be used to connect each tab to the gasket. The gasket may be in situ on a plate during the assembly. The robot or machine may select a suitable tab from a number of tabs for connection to a first peripheral connection area, or a suitable tab may be provided without the robot or machine performing a selection from many tabs. Once the tab is connected in place, the process may be repeated for each tab and peripheral connection area. This saves considerable time and effort relative to manual assembly of the tabs with the gasket. Of course, manual assembly is still possible if needed.

Attachment of each tab to an untabbed gasket is performed by pressing the tab downwards onto the relevant connection area, when the tab connection means and gasket connection means are suitably aligned. This may be done when the gasket is on a plate of a plate heat exchanger as above, although this is not essential.

The relevant connection area may or may not need to be moved or manipulated when attaching a given tab. For example, if corrugations on the plate edge obstruct the attachment, the connection area can be lifted slightly, and the tab attached by moving it along an axis perpendicular to the connection area when so lifted. The tab and connection area can then be lowered and engaged with the plate. This may require the now tabbed portion of the gasket to be manipulated to allow this. Flexibility in the gasket or peripheral connection area aids this.

In some cases, all of the tabs may be substantially identical, and any tab can be connected to any peripheral connection area. In other cases, two or more different shapes of tab may be provided, so it is necessary to ensure that the right tab is connected to a given connection area. Different tabs may be required to ensure that each particular tab does not interfere with the adjacent sealing portion of the gasket in use. If different shapes of tab are provided, it is necessary to select the correct shape of tab for a particular area either during assembly or in a preceding step. Of course, multiple robots or machines may be used, with each one dedicated to fitting only a subset of shapes of tab (or one type of tab).

Note that the peripheral connection areas are not suitable for connecting the gasket to the plate on their own. Put another way, each peripheral connection area lacks an integral structure suitable for connecting or holding the gasket body on the plate. It is only once discrete tab bodies are connected to the relevant connection areas that those areas become suitable for connection to the plate. Thus, the peripheral connection areas are peripheral tab connection areas.

Each peripheral connection area may include a finger or strip (or other elongate member) extending outwardly from the body. Each peripheral connection area may include a projection or pip extending away from a plane of that area for connection to a tab. Each peripheral connection area may consist of an elongate member and tab connection means.

Each tab connection means may be or provide a single connection for connecting a tab to the gasket.

For the purposes of this specification, a loop is considered to be a shape including a continuous body or path. The loop may be considered to include inner and outer perimeters, which do not run into one another. The shape may be regular (e.g. a circular or elliptical shape) or irregular. The loop may have straight and/or curved edges. Edges of the loop may link together to form an endless body. The loop may include angled or smoothed corners, for example. A region inside the loop is sealed by the loop when the gasket is compressed between two plates in a plate heat exchanger. The peripheral connection areas for the tabs are disposed outside of the seal or sealing region of the gasket.

Each tab may be releasably attachable to the body. This may be done by moving the tab along the axis away from the connection area. Each tab may include a rigid body.

Each tab connection means may have a push-fit connection with its respective connection area. Each tab connection means may interlock with or have a friction-fit connection with its respective connection area. Each tab may be independently attachable to or detachable from the gasket.

Each tab or connection area may include a projection or pip. The projection may include a detent or nub at its distal end. Each connection area or tab may include a corresponding recess or aperture for receiving the projection. Preferably, the tab includes a recess and the peripheral connection area includes a projection extending perpendicularly away from the plane of that peripheral connection area.

Using a complementary connection mechanism is a robust way to connect each tab to a gasket, and makes it quick and easy to connect a series of tabs to a gasket body. Providing a nub on the end of the projection can secure the projection against accidental detachment from the recess/aperture it is engaged with.

Each tab connection means may be disposed about halfway along the length of its peripheral connection area. That is, about halfway between the edge of the gasket body and a distal end (or free end) of the connection area.

For a given tab connected to a given peripheral connection area, a longitudinal axis of that tab may be parallel to a longitudinal axis of that peripheral connection area.

A substantially planar area may be provided on each tab. The planar area may form some or all of a rear face of the tab, for example. Another substantially planar area may be provided on each peripheral connection area. The planar areas on the tab and connection areas can be different shapes, but preferably they are each elongate. Respective planar areas on a given tab and connection area may abut each other when that tab is connected to its peripheral connection area.

For a given tab connected to a given peripheral connection area, the length or planar area of that tab may be substantially coextensive with the length or planar area of that peripheral connection area.

A band of the loop may have a substantially constant width. The connection areas may be provided in regions disposed outside of the band. The band is the part of the gasket which seals a plate. Typically, the band is not adapted to connect to or receive the tabs because it would potentially compromise the sealing properties of the gasket. Rather, the connection areas for the tabs can be provided as widened sections of the gasket body, next to the band.

The band is not necessarily distinct from the connection areas. The connection areas are preferably extensions of, or integrally formed with, the band. The band may be considered to be a region of the gasket body which is defined by imaginary parallel inner and outer borders which form inner and outer loops, defining a section of substantially constant width. The borders may snake around to form a loop, but remain substantially parallel to each other. Some sections of the gasket body may fall outside of the imaginary inner and/or outer borders. Those sections can contain or form the connections areas.

The peripheral connection areas may be provided on inner and/or outer sides of the loop. Where the connection areas are provided on inner and outer sides of the band, the band can be considered to be a central band. Connection areas may be provided on each side so that the gasket can be hooked over external and internal edges of the plate.

At least one additional loop may be connected to the body for sealing a flow channel through the plate. The or each additional loop may include one or more peripheral connection areas for connection to a tab. Other features relating to the connection areas and associated tabs can be the same as those provided for the main body of the gasket. The connection areas and/or tabs for the secondary loops may be slightly smaller than those of the main gasket body.

The tabs may be comprised of a different material to the body. For example, the tabs or clips may be made of plastic. The body may be made of rubber or a rubberised or rubber-like material. The tabs may each accord with the second aspect of the invention.

The gasket may be fitted to a plate for a plate heat exchanger, or provided in a plate heat exchanger.

According to a second aspect of the invention, there is provided a tab for connection to a gasket, the gasket including a body in the form of a loop for fitting to a plate of a plate heat exchanger, the body including a plurality of peripheral connection areas spaced along at least one side of the loop, each peripheral connection area being integrally formed with the body and including tab connection means; the tab comprising a pre-formed body which includes plate connection means (as a first connection means) for engagement to the plate, and gasket connection means (as a second connection means) as part of a complementary connection system for connection with the tab connection means, the gasket connection means being arranged along an axis which is substantially perpendicular to the plane of the pre-formed body.

Optional features are presented in the dependent claims.

The advantages associated with this (and the optional features below) are discussed with respect to the first aspect of the invention. If a given tab is defective, only that tab needs to be scrapped or replaced, rather than a whole gasket including the defective tab.

The tab connection means of the gasket may be disposed on or along an axis which is substantially perpendicular to the plane of its connection area.

Each tab is provided as a discrete unit, i.e. not integrally formed as part of a gasket. Each pre-formed tab can be attached to a gasket after the gasket body has been pressed or moulded. Each tab has a portion that is engageable with a plate, and a portion that is engageable with a gasket.

The body may be substantially T-shaped or D-shaped. The gasket connection means may be provided on a main stem of the T-shape or a branch or branches of the D-shape. For example, the gasket connection means may be at a distal end of the tab body. The gasket connection means may include or be a projection for engagement with the gasket, or a recess extending into or through the rigid body for receiving a projection on the gasket. That is, the recess is (if provided) in the body itself, for example in the stem. The recess can be considered to interrupt a surface (such as a planar or continuous surface) of the body.

The projection or recess may include an oval or elliptical cross-section. The tab may be substantially unable rotate relative to the tab connection means or projection as a result, when connected to the connection area. When connecting the tab to the gasket, the tab needs to be on the same axis as the tab connection means, and also maintained in the correct rotational position relative to the tab connection means for engagement therewith.

The tabs can be made of rubber or plastic, although in some circumstances other materials (e.g. metal or alloy) may be preferred. In preferred embodiments, the tab is a plastic tab.

The tab may be a rigid tab with a substantially rigid or inflexible body. The body may be somewhat flexible but more rigid than a comparable rubber body.

If the body is T-shaped, it may include first and second arms or fingers. The arms or fingers may depend from the T-bar of the body. That is, the arms or fingers may extend along axes which run substantially parallel to the axis of the central stem of the T-shaped body.

One or both of the arms or fingers may include a stepped end. The arms or fingers may provide the plate connection means. The main stem of the T-shaped tab may also include a stepped distal end. The stepped end(s) on a given tab may be customised for the intended location of the tab relative to a plate of a heat exchanger.

The stepped end(s) are preferably sized and shaped to accommodate the corresponding plate, to avoid interfering with the seal provided by the gasket between plates. For example, the stepped end(s) may be configured to accommodate a chevron or chevrons on the plate.

The stepped ends of various tabs on a single gasket may all be the same, or may be different according to the corresponding plate. For example, the stepped ends on tabs for an upper end of a plate may be shaped differently to the various other tabs.

If the body is D-shaped, it may include an arm or finger (or a plurality of arms or fingers) for connection to a plate. The arm(s) or finger(s) may be disposed substantially between two longer arms or fingers for connection to the gasket. In the case of a single arm or finger, it may be disposed substantially centrally between the longer arms/fingers. The arm(s) or finger(s) may (each) include a stepped end.

The tab may be connected to a gasket on a plate for a plate heat exchanger, or provided in a plate heat exchanger.

A mould may be provided which is adapted to manufacture one or more of the rigid tabs. The mould may include one or more individual or discrete recesses or sections for producing single or linked tabs. The mould may include one or more elongate recesses or sections for producing a series of linked tabs, for separation from each other after moulding. This avoids needing to position many individual pieces or lots of tab material. The elongate recess(es) may have a number of narrowed sections or necks to make it easier to separate the linked tabs. The tabs may be formed as branches of a main stem of the recess. The mould nay be a compression mould or an injection mould.

If the tabs are being made from rubber, then the mould may also include both a channel or recess for producing a gasket body or loop. If so, the tab recesses may not connect to that channel. The tab recesses may be spaced around the gasket channel. This avoids needing to manufacture the tabs in a separate step. Instead, they can be pressed at the same time as the gasket body, reducing the overall time for manufacture.

If the tabs are instead to be made of plastic, they can be formed by injection moulding or by compression moulding, for example. This is preferred and avoids the need to remove waste rubber material from the individual tabs once formed.

According to another aspect of the invention, there may be provided a gasket (or an untabbed gasket) comprising a body in the form of a loop for fitting a plate of the plate heat exchanger. The body may include a plurality of peripheral connection areas spaced along at least one side of the loop. Each peripheral connection area may be integrally formed with the body. Some/all of the peripheral connection area may include tab connection means. Some/all of the peripheral connection areas may not include plate connection means or, put another way, may not include integrally-formed plate connection means. More particularly, the gasket may not include any integrally-formed tabs or clips. Each peripheral connection area may consist of an elongate member (unsuitable for securing the gasket to a plate) and the tab connection means. The elongate member may extend away from the body, in the plane of the body. The elongate member may be up to about 2 cm long. Tabs of the second aspect of the invention may be connected to the gasket.

According to a third aspect of the invention, there is provided a kit comprising a plurality of tabs each according to the second aspect of the invention. The kit may optionally include an untabbed gasket.

There may be provided a plate for a plate heat exchanger, which comprises a gasket according to the first aspect of the invention, or a tab according to the second aspect of the invention, or a kit according to the third aspect of the invention.

There may be provided a plate heat exchanger, which comprises a gasket according to the first aspect of the invention, or a rigid tab according to the second aspect of the invention, or a kit according to the third aspect of the invention; or comprises one or more plates including such a gasket, tab or kit.

According to a fourth aspect of the invention, there is provided a method of manufacturing a gasket for a plate heat exchanger, the method comprising the steps of:

a) in a first device or mould, forming a gasket body as a loop with one or more peripheral connection areas configured for connection to tabs, the connection areas being spaced along at least one side of the loop, each peripheral connection area being integrally formed with the gasket body, each peripheral connection area including tab connection means; and b) in a second (or different) device or mould, forming a plurality of tabs which are discrete from the gasket body, and which each include connection means adapted to co-operate or engage with the tab connection means on the peripheral connection areas on the body.

Moulding the gasket body as a separate item to the tabs has similar advantages to those discussed for the first aspect of the invention.

Step (a) may include providing a number of pieces of rubber in a mould, where each end of each piece of rubber is disposed adjacent to another piece of rubber. Each piece is a single 'thread' or cylinder of raw material. This means that, when moulded, none of the ends of the rubber pieces forms a 'free end', which would be the case when forming integral tabs. Instead, the ends of each rubber piece are linked together with the adjacent rubber pieces, forming one or more loops and optionally bridging pieces, but without integral tabs.

The method may include the step of connecting at least one tab to its corresponding connection area, to form a tabbed gasket. Preferably, this is done for each tab. This may be done by aligning the gasket connection means of a given tab along an axis of the tab connection means in a given connection area, the axis being substantially perpendicular to the plane of that connection area. The tab can then be moved (i.e. translated) along that axis towards and into engagement with the tab connection means.

The gasket can then be attached to a plate for a plate heat exchanger in a conventional manner. Alternatively, the gasket body may be positioned on a plate for a plate heat exchanger. The tabs may then be connected to the connection areas and the plate respectively, to secure the gasket in place.

Each tab may be a rigid tab according to the second aspect of the invention.

The tabs may be formed by injection moulding or by compression moulding. Preferably this is done when the tabs are made of plastic. Alternatively, the gasket body and the tabs may be formed in discrete regions of the same mould or press. When the tabs and gasket are both made of rubber, this saves time and costs during manufacture.

In another aspect of the invention, there is provided a gasket for a plate heat exchanger, the gasket comprising a body in the form of a loop for fitting to a plate of the plate heat exchanger, the body including a plurality of peripheral connection areas spaced along at least one side of the loop, and a plurality of tabs for securing the gasket in position on the plate, each tab being discrete from the body, and each tab including connection means which is receivable by or engageable with one of the connection areas to connect the tabs and body together. Any preceding or subsequent gasket-related and/or tab-related feature or features may be included. For example, each peripheral connection area may be integrally formed with the body. Each peripheral connection area includes tab connection means.

In another aspect of the invention, there is provided a tab for connection to a gasket according to the above aspect of the invention, with the tab comprising a preformed body which includes a first connection means for engagement to a plate, and a second connection means as part of a complementary connection system for connection with a corresponding part of the gasket. Any preceding or subsequent gasket-related and/or tab-related feature or features may be included. For example, the tab may be made of plastic. The tab may be rigid.

In another aspect of the invention, there is provided a method of manufacturing a gasket for a plate heat exchanger, the method comprising the steps of (a) forming a gasket body as a loop with one or more peripheral connection areas configured for connection to tabs, the connection areas being spaced along at least one side of the loop; and (b) forming a plurality of tabs which are discrete from the gasket body, and include connection means adapted to co-operate or engage with the connection areas on the body. Any preceding or subsequent gasket-related, tab-related and/or method-related feature or features may be included.

BRIEF DESCRIPTION OF THE DRAWINGS

For a better understanding of the present invention, and to show more clearly how it may be carried into effect, reference will now be made by way of example only to the accompanying drawings, in which.

DETAILED DESCRIPTION

Referring firstly to FIGS. 1A to 1G, prior art embodiments of various integral tab types are shown. A T-clip on part of a gasket is shown generally at 10, with a T-clip 12. A D-clip on part of a gasket is shown generally at 20. Other clip types are indicated generally at 30, 40, 50 and 60. These clips are described in the background section.

Figure 1A:
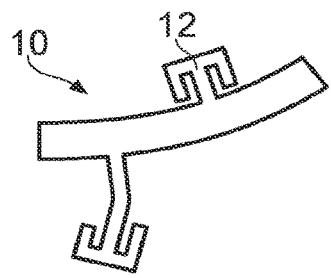
FIG. 1A shows a plan view of a known T clip attached to part of a gasket.
Figure 1B:
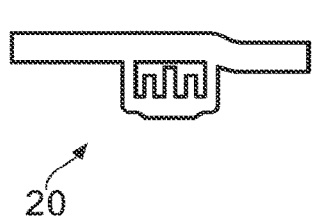
FIG. 1B shows a plan view of a known D clip attached to part of a gasket.
Figure 1C:
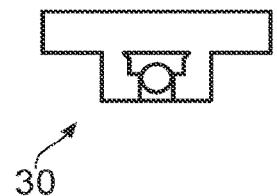
FIG. 1C shows a plan view of a third type of known clip attached to part of a gasket.
Figure 1D:
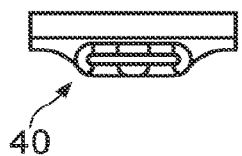
FIG. 1D shows a plan view of a fourth type of known clip attached to part of a gasket.
Figure 1E:
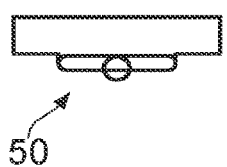
FIG. 1E shows a plan view of a fifth type of known clip attached to part of a gasket.
Figure 1F:
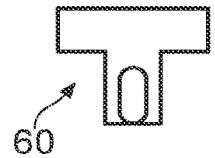
FIG. 1F shows a plan view of a sixth type of known clip attached to part of a gasket.
Figure 1G:
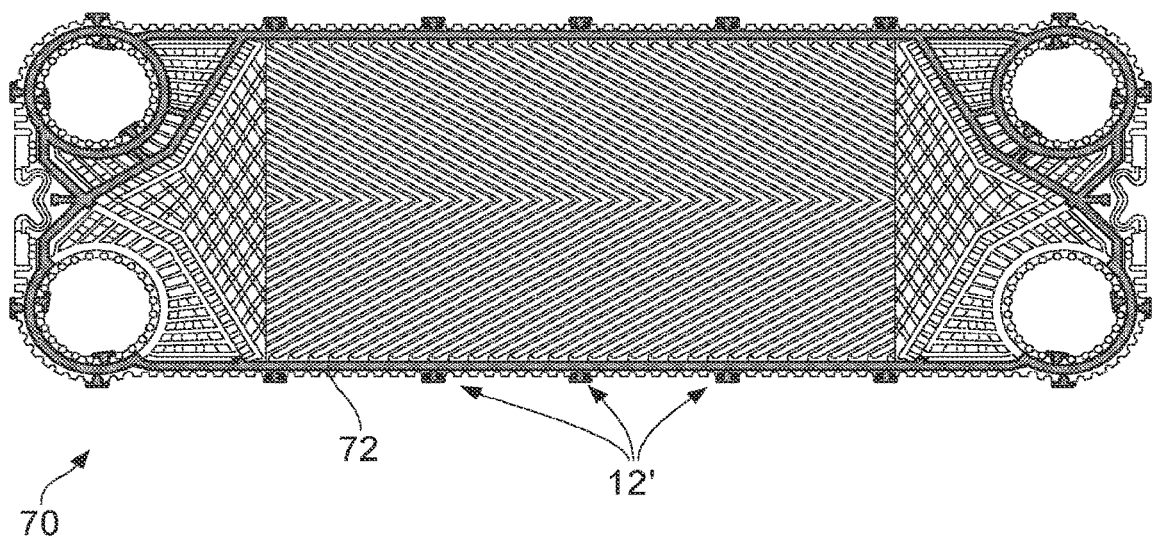
FIG. 1G shows a plan view of a known plate for a plate heat exchanger, and a gasket fitted to the plate using T clips of the type shown in FIG. 1A.

In FIG. 1G, a plate for a plate heat exchanger is indicated generally at 70. The plate 70 is of a conventional shape. The plate 70 has a corrugated surface. The plate 70 also includes a castellated or zig-zag edge. A gasket 72 is fitted to the plate 70 and sits in a gasket receiving channel or area. The gasket 72 includes a plurality of T-clips 12', similar to those shown in FIG. 1A. Free ends of the T-clips are engaged over the edge of the plate 70 in a conventional manner.

Figure 1H:
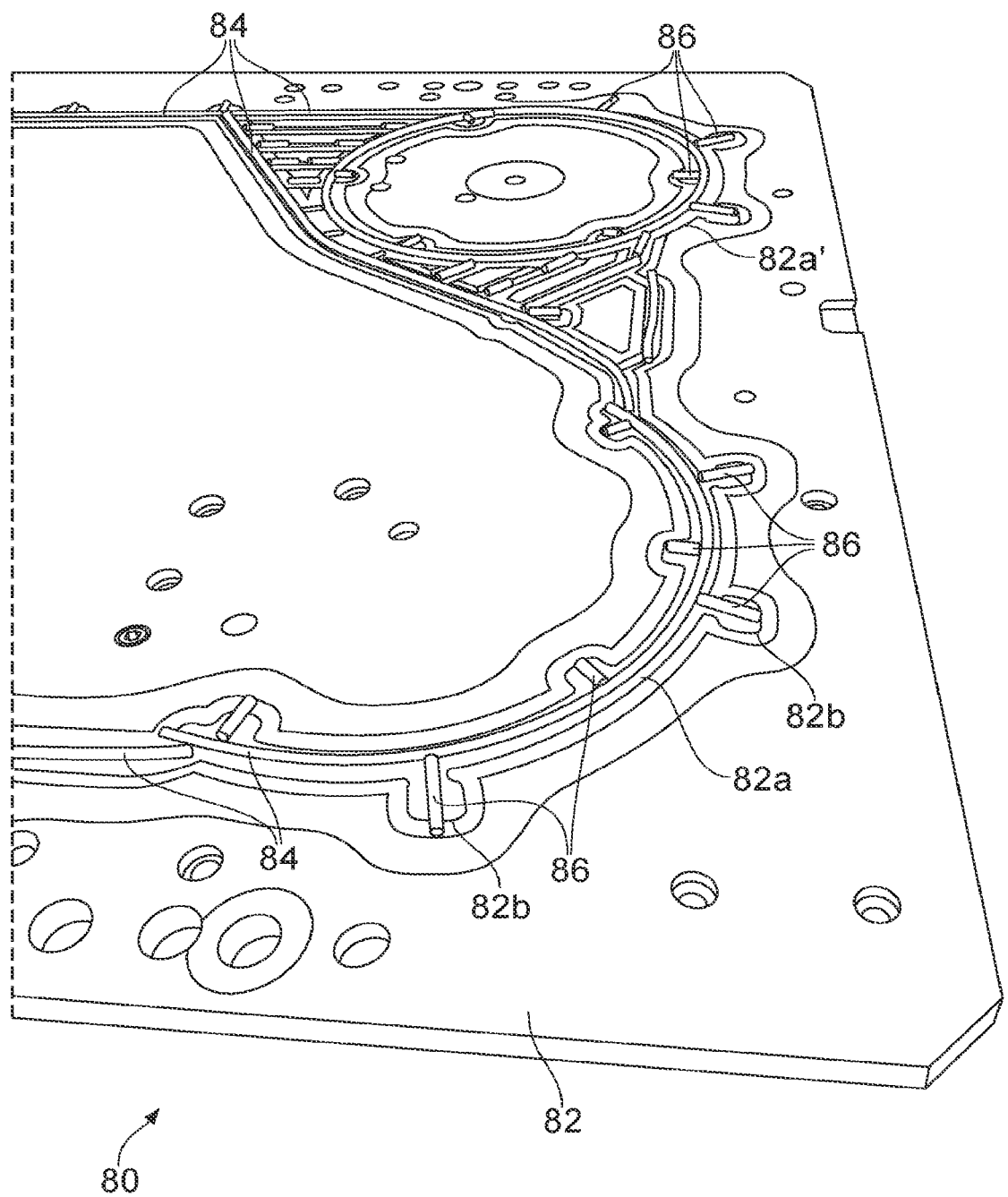
FIG. 1H shows a perspective view of part of a mould used to produce a gasket like the one shown in FIG. 1G.

FIG. 1H shows part of a prior art arrangement for producing a gasket, indicated generally at 80. The arrangement includes one part of a mould 82, i.e. the lower plate of upper and lower machined plates. The mould 82 has a series of main channels or grooves 82a. Another channel 82a' is provided for a port or flow channel in a plate for the plate heat exchanger, so that part of the gasket will seal the periphery of the port in use.

Elongate pieces of rubber 84 are located in the channels 82a, ready to be pressed and heated to form the gasket. Some pieces of rubber also form bridging sections connected at both ends between rubber pieces in the main channels 82a. The mould 82 also includes secondary channels 82b for forming tabs. Shorter pieces of rubber 86 are independently located in the secondary channels 82b. One end of each shorter piece is adjacent to one of the main channels 82a, but the other end is a free end, not adjacent to another piece of rubber. This allows the shorter pieces to be moulded as clips.

FIGS. 2 to 7 will now be described in more detail. Where different embodiments are described, then like reference numerals will be used to label equivalent parts in those embodiments. For example, if a given part is labelled 150 in a first embodiment, an equivalent part would be labelled 250 or 350 in subsequent embodiments.

Figure 2:
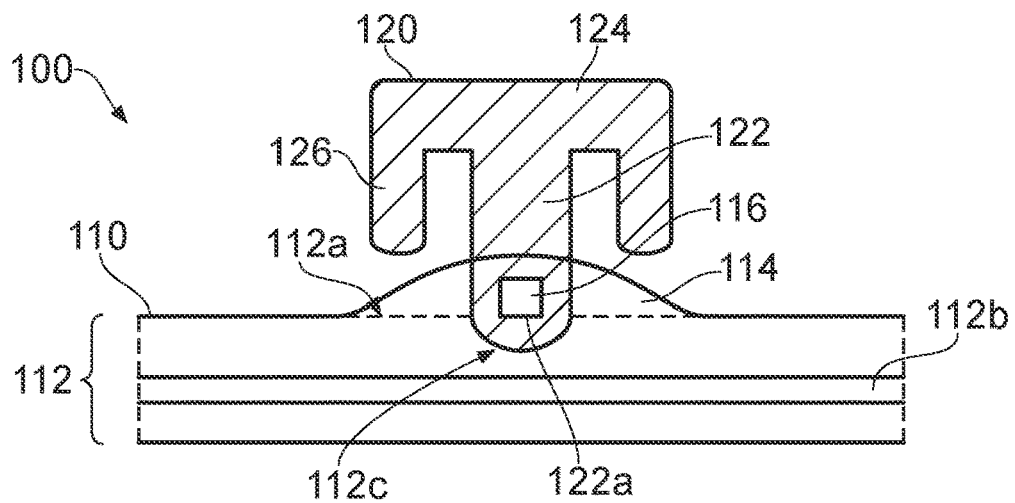
FIG. 2 shows a cross-sectional view of a first embodiment of a tab engaged with a projection on part of a gasket.

Referring firstly to FIG. 2, a first embodiment of a gasket is indicated generally at 100. The arrangement 100 includes a gasket body 110, only part of which is shown. The gasket body 110 is 'tab-less' when manufactured, i.e. it does not include integral tabs. The gasket body 110 includes a continuous or endless loop. The loop is approximately shaped like a trapezium, with upper and lower parallel pieces, one being longer than the other. Additional loops (not shown) are also provided. The gasket body 110 can be shaped in a similar manner to the gasket 72 shown in FIG. 1G.

The gasket body 110 is formed of a strip of material with parallel sides. This provides a band indicated generally at 112. The band 112 is mainly defined by the parallel sections of the sides. As seen in FIG. 2, the edges of the body 110 are parallel in some places. An imaginary line 112a is shown for reference. The band 112 is a region of substantially constant width within the loop.

The body 110 also includes a ridge 112b. The ridge 112b is slightly rounded at its apex. The ridge 112b is provided along the length of the band 112 in this embodiment. Angled surfaces extend away from each side of the ridge 112b. The other side of the body 110 is substantially flat. When compressed between two plates, the ridge 112b is flattened and helps to establish a seal against one of the plates, whilst the other flat side seals against the other plate.

Figure 3:
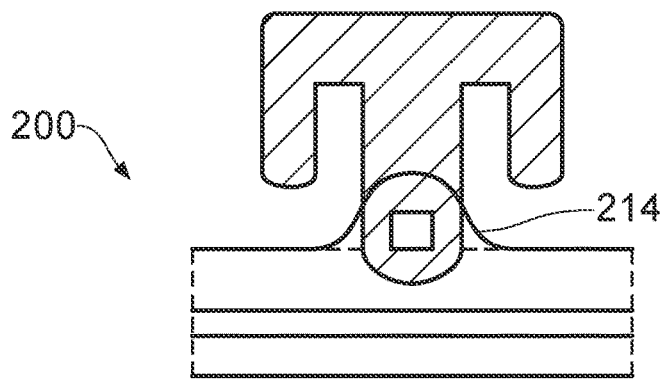
FIG. 3 shows a cross-sectional view of a second embodiment of a tab engaged with part of a gasket.

The gasket body 110 also includes a tab engagement portion 114. The portion 114 is a peripheral area for connection of a tab. The tab engagement portion 114 is integrally formed with the body 110. The tab engagement portion 114 in FIG. 2 is shaped as a bulge or curved extension of the body 112. It is about as wide as the maximum width of a tab to be attached to it. The tab engagement portion 114 can be considered to be an extension or widened part of the body 110. Referring also to FIG. 3, a variation of the gasket is indicated generally at 200. In this embodiment, the tab engagement portion 114 is narrower than that of FIG. 2. The gasket 200 is the same as the first gasket 100 in other respects.

Referring again to FIG. 2, although only one portion 114 is shown, a number of tab engagement portions 114 are provided on the gasket body 110. Unless otherwise indicated, each tab engagement portion 114 in this embodiment is substantially identical to the other, and described by reference to the single example shown in FIG. 2.

The portions 114 are spaced apart from each other along respective edges of the body 110. This gives rise to an undulating edge (not shown) on each edge of the gasket body 110. For example, considering the perimeter of the upper or lower parallel sections of the gasket body 110, there are a series of colinear straight sections interrupted by curved deviations which curve away from one straight section, and curve back into another straight section. The undulating portions of each edge are not necessarily in phase.

A plate (not shown) adapted to receive the gasket body 110 should be shaped to accommodate the tab engagement portions 114 without compromising the seal created by the gasket 100. The central region of the gasket body 110 therefore has a substantially uninterrupted area along its full length.

The tab engagement portions 114 are provided on both edges of the gasket body 110 in this embodiment. However, it will be appreciated that some embodiments may provide the portions 114 on one side only. This may be required to avoid compromising the shape (e.g. corrugated areas) of plates in a plate heat exchanger, if that would reduce overall operational efficiency.

The tab engagement portion 114 includes a projection 116. The projection 116 is located outside the band 112. The projection 116 is one part of a complementary tab connection system or tab engagement system. The projection 116 is integrally formed with the tab engagement portion 114. The projection 116 has a substantially square profile from above in this embodiment. The side profile can be seen to be substantially square in FIG. 4A. It will be appreciated that either or both profiles of the projection could be rectangular. Using a square or rectangular projection profile ensures that a tab attached to the gasket body 110 does not rotate relative to the body 110 prior to the tab being engaged with a plate.

Figure 4A:
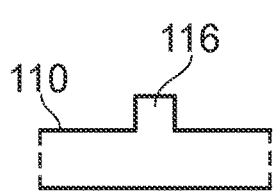
FIG. 4A shows a side view of the projection on the gasket of FIG. 2.
Figure 4B:
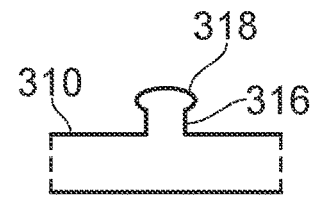
FIG. 4B shows a side view of a second embodiment of a projection on a gasket.

Referring also to FIG. 4B, an alternative projection 316 is shown as part of a gasket 310. The projection 316 includes a nub or widened end 318. When engaged through an aperture in a tab, the nub 318 provides a barrier to tab detachment.

Referring again to FIG. 2, the arrangement 100 also includes a tab 120. The tab 120 is T-shaped. The tab 120 has a pre-formed body, i.e. it is a discrete component rather than co-formed as part of the gasket body 110. Although only one tab 120 is shown, it will be appreciated that a number of other tabs 120 are provided but not illustrated. Each tab 120 is connectable to one of the number of tab engagement portions 114 referred to above. Unless otherwise indicated, the tabs 120 in this embodiment are all substantially identical, and described by reference to the single example shown in FIG. 2.

In this embodiment, each tab 120 is made of rubber, like the gasket body 110. However, it will be appreciated that one formulation or type of rubber may be used for the body 110, and a different formulation or type of rubber may be used for the tabs 120.

The tab 120 includes a main stem 122. A connection aperture 122a is provided towards an end of the main stem 122. The aperture 122a is inset from the end of the stem 122. The aperture 122a is centred on a longitudinal axis of the stem 122 in this embodiment.

A cross-bar 124 is connected across another end of the main stem 122. Two secondary stems or arms 126 are connected to either end of the cross-bar 124. The arms 126 run substantially parallel to the main stem. The arms 126 extend to the same side of the cross-bar 124 as the main stem 122. The arms 126 are shorter than the main stem 122. The arms 126 can fit over an edge of a plate in a conventional manner.

The connection aperture 122a is configured to be co-operable with or complementary to the projection 116 on the tab engagement portion 114. The aperture 122a can be engaged over or interlocked with the projection 116. This secures the tab 120 to the gasket body 110. In this embodiment, a friction fit is sufficient to ensure that the tab 120 is held in place on the gasket body 110.

When the tab 120 is engaged with the projection 116, part of a distal end of the stem 122 lies over the band 112. In this embodiment, a recessed section 112c is provided in the relevant part of the band 112, to receive the distal end of the tab 120. This avoids increasing the effective thickness of the gasket 100 at each tab location, which could reduce its sealing effectiveness in use. However, this is not essential. The gasket 100 can still perform adequately without the recessed section 112c. Alternatively, the tab 120 may decrease in thickness or taper at the distal end, for fitting flush to the gasket body 110.

Tabs 120 can be added to the gasket body 110 to provide a tabbed gasket 100, and the gasket 100 then fitted to a plate. Alternatively, the gasket body 110 can be fitted to a plate, and the tabs 120 then connected to each of the gasket body 110 and plate.

The tab 120 can be removed from the gasket body 110 for servicing. If the gasket body and tab are both in good condition, the tab 120 can be re-attached for re-connecting the gasket 100 to the plate. If one or other of the parts is worn out, they are replaced as needed.

To make the gasket 100, a mould (not shown) is used. The mould has two parts which correspond to the shape of a plate for a plate heat exchanger. The mould has a main channel corresponding to the loop of the gasket body 110, and two secondary channels for forming additional loops for ports in a plate. The secondary channels are linked to the main channel. The arrangement is similar to that shown in FIG. 1G. The main channel includes regions corresponding to peripheral connection areas for tabs. The secondary channels can also include such regions. However, minor grooves or channels for forming tabs are not provided as offshoots of the main or secondary channels. In other words, no tab- or clip-forming channels are linked to the gasket-forming channels.

Instead, tab-forming channels may be provided in sections of the mould which are isolated from the main or secondary channels. For example, in the middle of the mould, with the main channel encircling the tab-forming channels. This allows tabs to be formed in the same step as the gasket body.

Cylindrical rubber pieces (or another suitable material) are placed end-to-end in all of the channels. The mould is heated and used to compress the rubber pieces, causing them to flow and form a single gasket body without tabs, optionally with a number of discrete tabs which are isolated from the gasket body. Once compressed for the required number of seconds, the mould is opened and compressed air is used to help release each of the gasket body and the pre-formed tabs from the mould. Residual rubber edging is then stripped away. The tabs can be individually attached to gasket body 110 as discussed earlier.

In other embodiments, the tabs can be moulded separately, e.g. injection-moulded from plastic. The tabs could be linked by frangible bridging pieces, and subsequently separated from each other, or just moulded as individual units.

Figure 5:
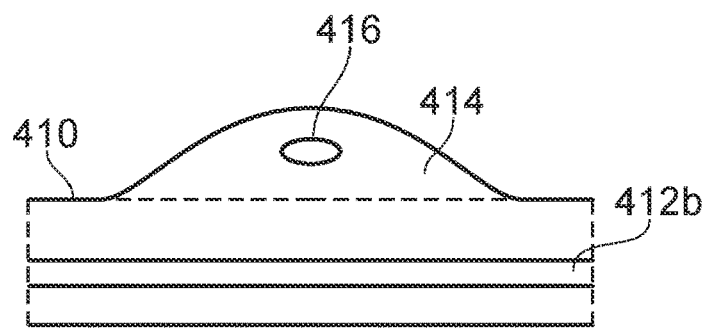
FIG. 5 shows a plan view of another embodiment of part of a gasket including a recess.

Referring now to FIG. 5, another embodiment of a gasket 410 is shown. In this embodiment, a peripheral connection area 414 includes an aperture 416. The aperture 416 is substantially elliptical. It will be appreciated that a tab to be engaged with the connection area 414 will include a corresponding projection shaped to fit into or through the aperture 414.

Figure 6A:
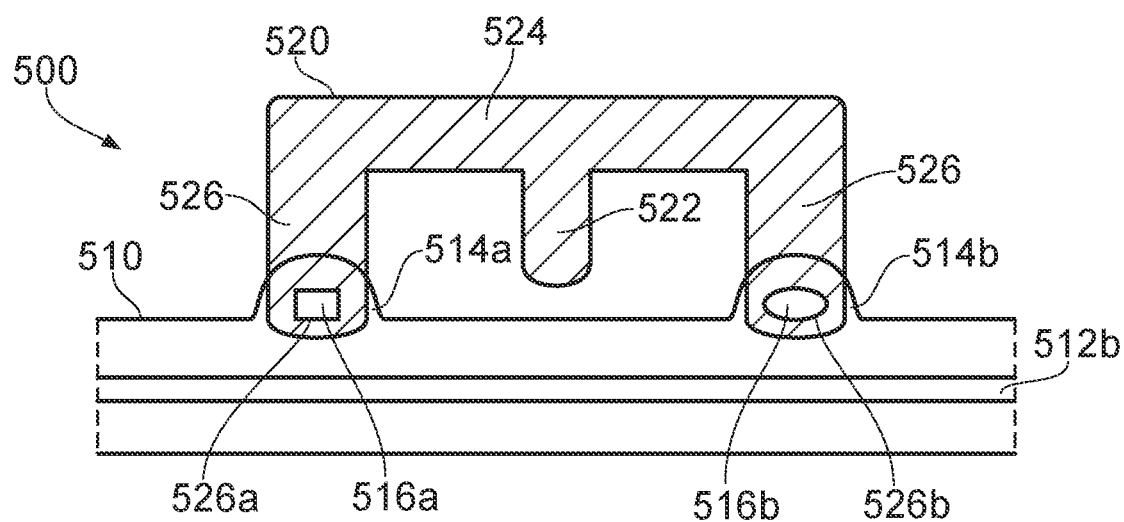
FIG. 6A shows a cross-sectional view of a third embodiment of a tab engaged with projections on part of a gasket.
Figure 6B:
FIG. 6B shows a side view of the projections on the gasket in FIG. 6A.

Referring now to FIGS. 6A and 6B, another embodiment of a gasket is indicated generally at 500. Except where indicated otherwise, the features of this gasket are the same as the embodiment described with respect to FIG. 2.

In this case, a gasket body 510 includes neighbouring connection areas 514a, 514b. The connection areas 514a, 514b are spaced apart by a distance corresponding to the width of a tab. Each connection area 514a, 514b includes a corresponding projection 516a, 516b. One of the projections 516a includes a square-shaped end. The other of the projections 516b includes a rounded or elliptical end and a nub 518. The side profiles of the projections 516a, 516b are shown in FIG. 6B (only the gasket body 510 is shown for clarity).

A D-shaped tab 520 is connected to each of the projections 516a, 516b. The tab 520 includes a middle arm 522 which is connected at one end to a cross-bar 524. First and second stems 526 are provided at each end of the cross-bar 524. Each stem 526 includes an aperture 526a, 526b which fits over and around one of the projections 516a, 516b. The first aperture 526a is square-shaped. The second aperture 526b is elliptical.

In this embodiment, if all the tabs on the gasket 510 are D-shaped tabs 520, then the ratio of connection areas to tabs is 2:1. However, it may be appropriate to use a combination of D-shaped and T-shaped tabs, in which case there will be a corresponding number of connection areas. It will also be appreciated that both projections may have the same shape in variations of this embodiment.

Figure 7:
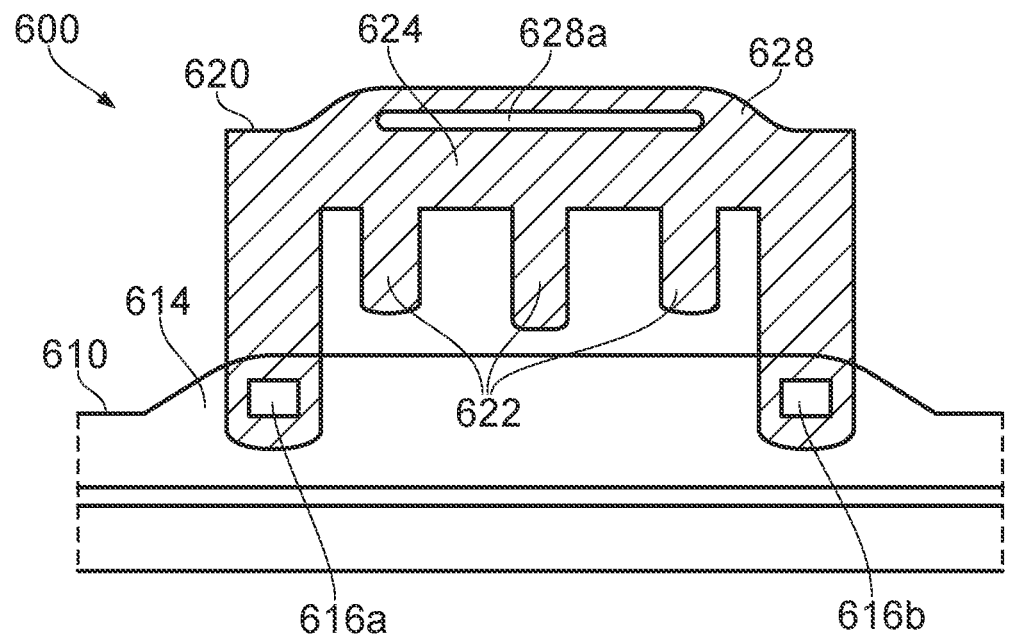
FIG. 7 shows a cross-sectional view of a fourth embodiment of a tab engaged with projections on part of a gasket.

Referring now to FIG. 7, another embodiment of a gasket is indicated generally at 600. This embodiment is similar to that of FIGS. 5-6B. However, there are several differences, described below.

A gasket body 610 includes a connection area 614. The connection area 614 extends from the gasket body 610 at a fixed angle rather than a curve. In other words, the edge of the connection area 614 does not smoothly transition into the edge of the gasket body 610. The connection area 614 includes two projections 616a, 616b. The projections 616a, 616b are spaced apart by a distance corresponding to a tab.

A D-shaped tab 620 includes three arms 622 spaced along the middle of the tab 620. Each arm 622 has a free end for engaging the edge of a plate for a plate heat exchanger. The tab 620 is connected to the gasket 610 in a similar way to that described for FIG. 5.

The tab 620 includes a cross-bar 624 with a slot 628a. In this embodiment, an extension 628 of the cross-bar 624 is provided to define the slot 628a. This allows the slot 628a to be located outside the main body of the cross-bar 624. The slot 628a can be engaged over a projection on a plate, for example.

Figure 8:
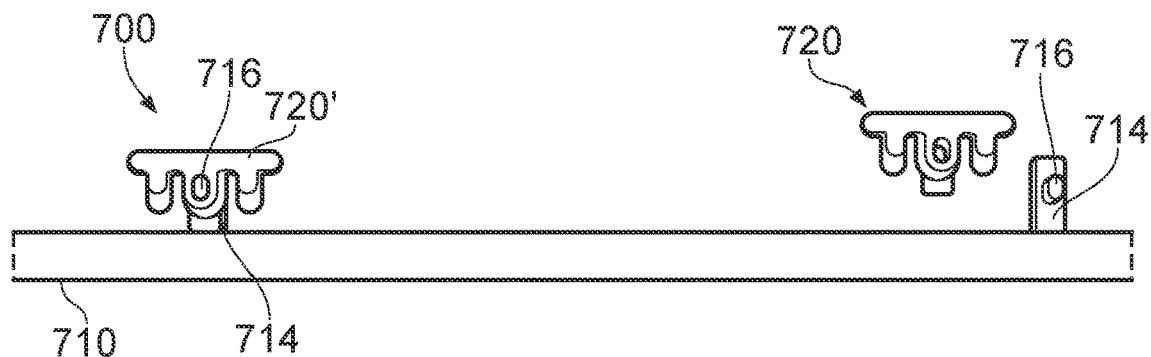
FIG. 8 shows a plan view of another embodiment of a gasket (in part) and tabs according to the invention.
Figure 9A:
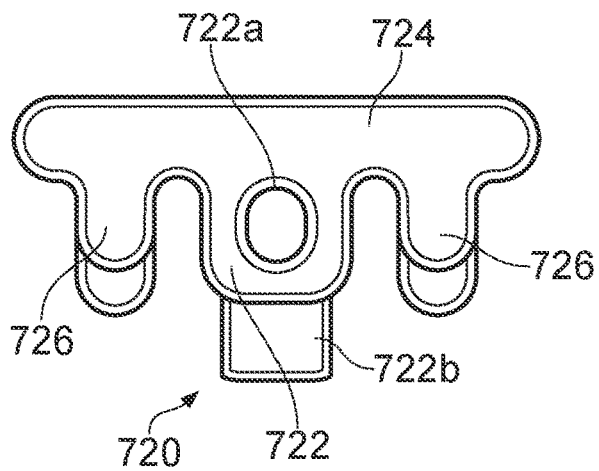
FIG. 9A shows a plan view of one of the tabs of FIG. 8.
Figure 9B:
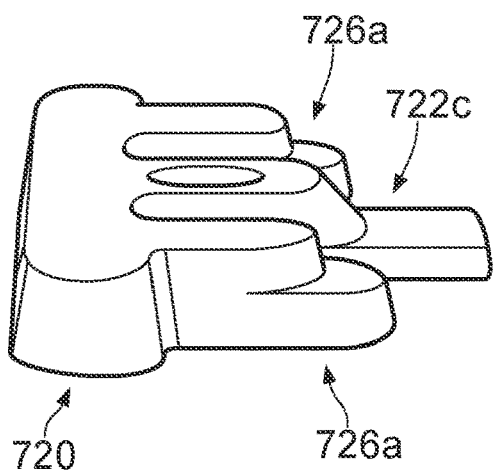
FIG. 9B shows a side perspective view of the tab of FIG. 9A.
Figure 10:
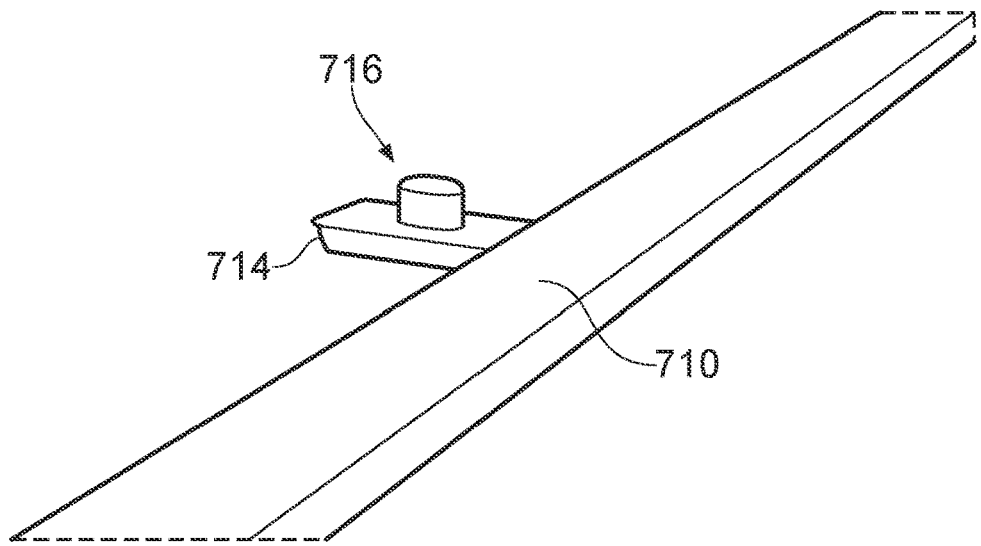
FIG. 10 shows a perspective view of part of the gasket of FIG. 8.

Referring now to FIGS. 8 to 10, another embodiment of a gasket and tabs is indicated generally at 700. The features of the gasket and tabs are similar to various preceding embodiments of the invention unless otherwise described.

A gasket 710 is provided. Only part of the gasket is shown in FIGS. 8 and 10. It will be appreciated that the gasket 710 is formed in a loop suitable for fitting to a plate of a plate heat exchanger. The upper side of the gasket 710 as shown is substantially flat or planar. The underside (not visible) has two angled surfaces which meet at a ridge, as described for previous embodiments.

The gasket 710 includes a plurality of peripheral tab connection areas 714. Each peripheral connection area 714 is disposed substantially in the plane of the gasket body. The peripheral connection areas 714 are integrally formed with the gasket 710. The peripheral connection areas 714 do not include integrally-formed tabs or clips. That is, they are unsuitable for connection to a plate on their own.

Two of the tab connection areas 714 are shown in FIG. 8, but it will be appreciated that others are spaced along other parts of the gasket 710 which are not illustrated here. Each peripheral connection area 714 includes an elongate member (or finger) which extends away from the gasket 710. The elongate member has a substantially rectangular perimeter. Each elongate member is thinner than the gasket body (about less than half the thickness in this embodiment). Each elongate member has a substantially flat or planar upper surface (except for the projection discussed below). The elongate member extends substantially perpendicularly away from the longitudinal axis of the gasket 710 in the region where it joins the gasket. Each elongate member is joined to the gasket 710 substantially towards or at one of the angled faces of the gasket 710.

It will be appreciated that each elongate member can extend away from the gasket at any suitable angle, according to the required position for a given plate. In various embodiments, some/all of the elongate members may be normal to the gasket axis, and some/all of the elongate members may be at an oblique angle to the gasket axis.

A projection 716 extends away from the elongate member. In this embodiment, the projection extends in the direction of the plane of the flat side of the gasket 710. The projection 716 is substantially cylindrical. In this embodiment, the projection 716 is slightly longer than it is wide (with the longer portion being arranged along the elongate member in the embodiment shown). So, the projection 716 has a cross-section which is substantially oval in shape. The height of the projection 716 is about 2 mm in this embodiment. Any suitable height may be used, if sufficient to engage a tab. The height of the projection and thickness of the elongate member are substantially equal to the thickness of the gasket body.

A tab 720 is indicated at 720. Another tab is indicated at 720', indicating that it is attached to a peripheral connection area 714. The tabs 720, 720' are releasably attachable to the gasket 710. Each tab 720 is substantially identical. Only one tab 720 will be described, but description is contemplated to apply for any additional tabs used in this embodiment.

The tab is rigid in this embodiment, i.e. substantially inflexible. The tab is made of plastic in the embodiment. The tab is integrally-formed, for example by compression moulding. The tab 720 is substantially T-shaped in this embodiment. Edges of the tab 720 are rounded. The tab 720 includes a main stem 722. A free end (or distal end) 722b of the stem 722 is substantially flat or planar. The flattened end 722b is slightly narrower than the rest of the stem 722. The free end can be considered to be a stepped end (or to include a step) as indicated generally at 722c.

An aperture 722a is provided in the middle of the main stem 722a. The aperture 722a is shaped to complement the size and shape of the projection 716. Hence, the aperture 722a has a substantially oval-shaped cross-section. The depth of the aperture 722a is approximately the same as or slightly greater than the height of the projection 716.

A cross-bar 724 is joined at an end of the main stem 722. The length of the main stem 722 and adjoining cross-bar 724 is substantially the same as the length of the elongate member of the peripheral connection area 714. The length and width of the main stem 722 is approximately equal to the length and width of the elongate member of the connection area 714.

Two secondary stems or arms 726 are connected to either end of the cross-bar 724. The secondary stems or arms are slightly inset from respective ends of the cross-bar 724. Ends of the cross-bar and stems/arms 726 are rounded. Each secondary stem or arm includes a stepped end (or step), indicated generally at 726a. The arms 726 run substantially parallel to the main stem. The arms 726 extend to the same side of the cross-bar 724 as the main stem 722. The arms 726 are shorter than the main stem 722. The arms 726 can shaped to fit to an edge of a plate of a plate heat exchanger.

The aperture 722a is configured to be co-operable with or complementary to the projection 716 on the peripheral connection area 714. A rear face (not shown) of the main stem 722 includes a substantially flat or planar area for abutting the upper surface of the elongate member. By aligning the aperture 722a and projection 716 on the same axis, the aperture 722a can be pressed or pushed onto the projection 716 to secure the tab 720 to the gasket body 110. Due to the oval-like cross-sections, the rotational orientation of the tab 720 relative to the projection 716 needs to be correct too before the tab can be connected to the gasket.

When connected together, the projection 716 extends substantially most or all of the way through the aperture 722a. In other words, the volume of the projection is about equal to the volume of the aperture. In this embodiment, the depth of the aperture 722a does slightly exceed the height of the projection 716.

It will be appreciated that other variations or combinations of features from different embodiments may be freely combined within the scope of the claimed invention.

The use of a projection/through aperture connection is just one example of a suitable connection means for putting the tabs on the gasket. It may be appropriate to have a recess which the tabs are 'plugged' into, e.g. a hole with a closed end in one of the gasket body or tab, and a projection on the other part which fits into it. There may be a hook arrangement in other embodiments. For example, the stems of a D-shaped tab may be hooked around part of the gasket body.

For example, as discussed above, the gasket may be formed as a tab-less body, to which tabs are then added. However, it will be appreciated that the gasket may also be formed as a body with a selection of tabs in specific locations, to which supplementary tabs are then added. This is not necessarily preferred, but is considered to be within the scope of the claims. For example, it may be appropriate to have integrated tabs in some positions where providing and accommodating peripheral connection areas would disrupt or reduce performance of a plate as part of a plate heat exchanger.

The embodiments described above are provided by way of example only, and various changes and modifications will be apparent to persons skilled in the art without departing from the scope of the present invention as defined by the appended claim

The invention claimed is:

1. A gasket for a plate heat exchanger, the gasket comprising:

a body in the form of a loop for fitting to a plate of the plate heat exchanger, the body including a plurality of peripheral connection areas spaced along at least one side of the loop, each of the plurality of peripheral connection areas being integrally formed with the body, each of the plurality of peripheral connection areas including tab connection means, and a plurality of tabs for securing the gasket in position on the plate, each of the plurality of tabs being discrete from the body, and each of the plurality of tabs including gasket connection means which is receivable by or engageable with the tab connection means in one of the plurality of peripheral connection areas of the body to connect the tabs and body together, each of the plurality of tabs being connectable to one of the plurality of peripheral connection areas by movement of the entire tab along an axis of the tab connection means when the gasket connection means is aligned along that axis, the axis being substantially perpendicular to a plane of the one of the peripheral connection areas and the body of the gasket.

2. The gasket of claim 1 wherein each tab in the plurality of tabs is releasably attachable to the body to one side of the plane of the peripheral connection areas and the body of the gasket.

3. The gasket of claim 1 wherein the gasket connection means on each of the plurality of tabs has a push-fit connection with its respective peripheral connection area.

4. The gasket of claim 1 wherein one of each tab or peripheral connection area includes a projection, and the other one of each peripheral connection area or tab, which does not have the projection, includes a corresponding recess or aperture for receiving the projection, the projection or recess in the peripheral connection area being arranged on the axis which is perpendicular to the plane of that peripheral connection area.

5. The gasket of claim 1 wherein each tab connection means is disposed about halfway along a length of its peripheral connection area.

6. The gasket of claim 1 wherein the plurality of peripheral connection areas are provided on an inner side and an outer side of the loop.

7. The gasket of claim 1 wherein at least one additional loop is connected to the body for sealing a flow channel through the plate, and the or each additional loop includes one or more peripheral connection areas for connection to a tab.

8. The gasket of claim 1 wherein either:
(a) the plurality of tabs are comprised of a different material to the body; or
(b) the body and the plurality of peripheral connection areas are made of a rubber-like material, and some or all of the plurality of tabs are made of plastic.

9. The gasket of claim 1 wherein for a given tab connected to a given peripheral connection area, a longitudinal axis of that tab is substantially parallel to a longitudinal axis of that peripheral connection area.

10. The gasket of claim 1 wherein a substantially planar area is provided on each of the plurality of tabs, and a substantially planar area is provided on each of the plurality of peripheral connection areas, and respective planar areas on a given tab and peripheral connection area are in abutment when that tab is connected to that peripheral connection area.

11. The gasket of claim 1, wherein each of the plurality of tabs comprises a pre-formed body which includes a plate connection means for engagement to the plate, and gasket connection means as part of a complementary connection system for connection with the tab connection means, the gasket connection means being arranged along an axis which is substantially perpendicular to a plane of the pre-formed body.

12. The gasket as claimed in claim 11, in which the pre-formed body of each of the plurality of tabs is substantially T-shaped or D-shaped, and the gasket connection means is provided in or on one of: a main stem of the T-shape of the body; a branch or branches of the D-shape of the body.

13. The gasket as claimed in claim 11, in which the pre-formed body of each of the plurality of tabs is T-shaped and includes first and second arms or fingers, and one or both of the first and second arms or fingers include a stepped end.

14. The gasket as claimed in claim 11, in which the gasket connection means includes a projection for engagement with the gasket, or a recess extending into or through the pre-formed body for receiving a projection on the gasket.

15. The gasket as claimed in claim 11, in which each of the plurality of tabs is a rigid tab or a rigid plastic tab.

16. A method of manufacturing a gasket for a plate heat exchanger, the method comprising the steps of:
   a) in a first device, forming a gasket body as a loop with one or more peripheral connection areas configured for connection to tabs, the peripheral connection areas being spaced along at least one side of the loop, each peripheral connection area being integrally formed with the gasket body, each peripheral connection area including tab connection means; or otherwise providing such a gasket body;
   b) in a second device, forming a plurality of tabs which are discrete from the gasket body, and which each include gasket connection means adapted to co-operate or engage with the tab connection means on the peripheral connection areas on the body by movement of each entire tab along an axis of each respective tab connection means when the gasket connection means is aligned along that axis, the axis being substantially perpendicular to a plane of the peripheral connection areas and the body of the gasket; or otherwise providing such tabs.

17. A method as claimed in claim 16, further comprising the step of connecting at least one of the plurality of tabs to its corresponding tab connection area, to form a tabbed gasket where the at least one of the plurality of tabs is disposed to one side of the plane of the peripheral connection areas and the body of the gasket, by aligning the gasket connection means of the at least one of the plurality of tabs along said axis of the tab connection means in a given peripheral connection area, the axis being substantially perpendicular to the plane of that peripheral connection area and the gasket body, and translating the entire tab along that axis towards and into engagement with the tab connection means.

18. A method as claimed in claim 16, in which each of the plurality of tabs includes plate connection means for engagement to a plate of a plate heat exchanger, and the gasket connection means of a given tab is arranged along an axis which is substantially perpendicular to a plane of the tab.

19. A method as claimed in claim 16, in which the plurality of tabs are formed by injection moulding or compression moulding.

20. A method as claimed in claim 16, in which step (a) includes forming the gasket body without integral tabs.

* * * * *